United States Patent
Baker et al.

[15] 3,678,593
[45] July 25, 1972

[54] COMPASS SYSTEM AND COMPONENTS THEREFOR HAVING AUTOMATIC FIELD CANCELLATION

[72] Inventors: Donald H. Baker; Frank H. Kalillo, both of Phoenix, Ariz.

[73] Assignee: Sperry Rand Corporation

[22] Filed: Dec. 26, 1968

[21] Appl. No.: 787,143

[52] U.S. Cl. ..................................................33/355
[51] Int. Cl. ...........................................G01c 17/30
[58] Field of Search .........33/204.43, 204.44, 222.7, 222.75; 324/43

[56] References Cited

UNITED STATES PATENTS

| | | | |
|---|---|---|---|
| 2,599,124 | 6/1952 | Pritchard et al. | 33/204.43 |
| 2,727,206 | 12/1955 | Ryerson | 324/43 |
| 2,996,663 | 8/1961 | Ferguson | 324/43 |
| 3,167,698 | 1/1965 | Gray et al. | 33/222 X |
| 3,286,169 | 11/1966 | Slonczewski | 324/43 |

FOREIGN PATENTS OR APPLICATIONS

| | | | |
|---|---|---|---|
| 1,087,980 | 10/1967 | Great Britain | 324/43 |
| 619,525 | 3/1949 | Great Britain | 324/43 |

Primary Examiner—Robert B. Hull
Attorney—S. C. Yeaton

[57] ABSTRACT

A compass system utilizing a flux valve responsive to the earth's magnetic field in which the earth's field vector sensed by pick-up windings is resolved into component values that are converted to proportional DC currents from an infinite impedance current source that is independent of the load of the pick-up windings, these currents being fed back into the flux valve in a direction to cancel the earth's field vector whereby to drive the flux valve output towards null.

3 Claims, 4 Drawing Figures

INVENTORS
DONALD H. BAKER
FRANK H. KALLIO
BY

ATTORNEY

COMPASS SYSTEM AND COMPONENTS THEREFOR HAVING AUTOMATIC FIELD CANCELLATION

BACKGROUND OF THE INVENTION

1. Field of the Invention

The present invention pertains to magnetic compass systems utilizing magnetic azimuth detectors or flux valves in which the sensed earth's magnetic field vector is cancelled by means of closed loop techniques.

2. Description of the Prior Art

In typical prior art magnetic compass systems, for example, of the type shown in U.S. Pat. No. 3,233,332 entitled "Earth's Magnetic Field Responsive Systems" issued Feb. 8, 1966 and invented by D. H. Baker et al, the system with respect to the flux valve output may be considered open loop in that the resultant horizontal field sensed by the flux valve legs is repeated directly at a receiving device. The flux valve output signal of prior compass systems inherently has a high harmonic content such that it is difficult to directly demodulate the flux valve signals and obtain accurate results. Further, conventional demodulators are inaccurate due to the low power and low signal to-noise ratio of conventional flux valve signals. In a compass system of the above type, the flux valve is pendulously mounted so that its output signal is subject to short term errors during accelerated flight. Also, vibrations of the aircraft structure produce undesirable oscillatory flux valve outputs. Short term error compensation is accomplished by deriving an error measurement of the misalignment between the direction of the earth's magnetic field vector at the flux valve and the direction of a remote directional gyro, as by a control transformer and precessing the gyro on a long term basis, in a sense to eliminate the error. Oscillatory output signals must be filtered within the amplifier which provides the gyro precessing signal. This requirement becomes a constraint on amplifier characteristic. In certain present day compass systems it is desirable to provide DC signals representative of desirable components of the earth's magnetic field vector, for example, sine and cosine components which are readily adaptable to all electronic computations. The conversion of the AC signals from the flux valve to DC sine and cosine signals cannot be accurately and readily accomplished in prior art open loop systems, primarily because of the inherently distorted wave shape of the AC signals from the flux valve.

SUMMARY OF THE INVENTION

The present invention provides a compass system having a flux valve or magnetic azimuth detector responsive to the earth's magnetic field in which the flux valve output signal is converted to DC signals representative of the generally rectilinear components of the sensed magnetic field vector. DC currents representative of these components are fed back into the legs of the flux valve in a direction which tends to cancel the earth's field vector and eventually drive the flux valve output to null, the values of the feedback currents thus representing the values of said components. Thus, the compass system operates about a null condition in closed loop fashion affording extremely high magnetic direction accuracy. There are several reasons for this improved accuracy. By virtue of operating about null, the full AC wave inherently rich in harmonics is not required and the signal-to-noise ratio of the output signal is substantially enhanced. Further, the system does not require the use of a control transformer on an electromechanical follow-up servo as normally utilized in prior art systems. The flux valve oscillations normally occurring in flux valve systems are readily filtered prior to use in error determination thereby avoiding the problems associated with prior art systems. By providing filtering of the flux valve signal before it is applied to a slaving control servo loop, for example, the effect of the filtering can be separated from the slaving control function characteristic which ultimately provides for better system transfer function parameter control. In addition, the DC current source utilized provides compatibility with DC insertion compensation techniques and calibration techniques operating with low voltage signals. The invention therefore provides extremely accurate voltage analogs of flux valve heading which are compatible with conversion to digital signals using DC to digital converters or for use as direct analog outputs, i.e., in the form of sine and cosine values.

DESCRIPTION OF THE PREFERRED EMBODIMENT

Figure 1:
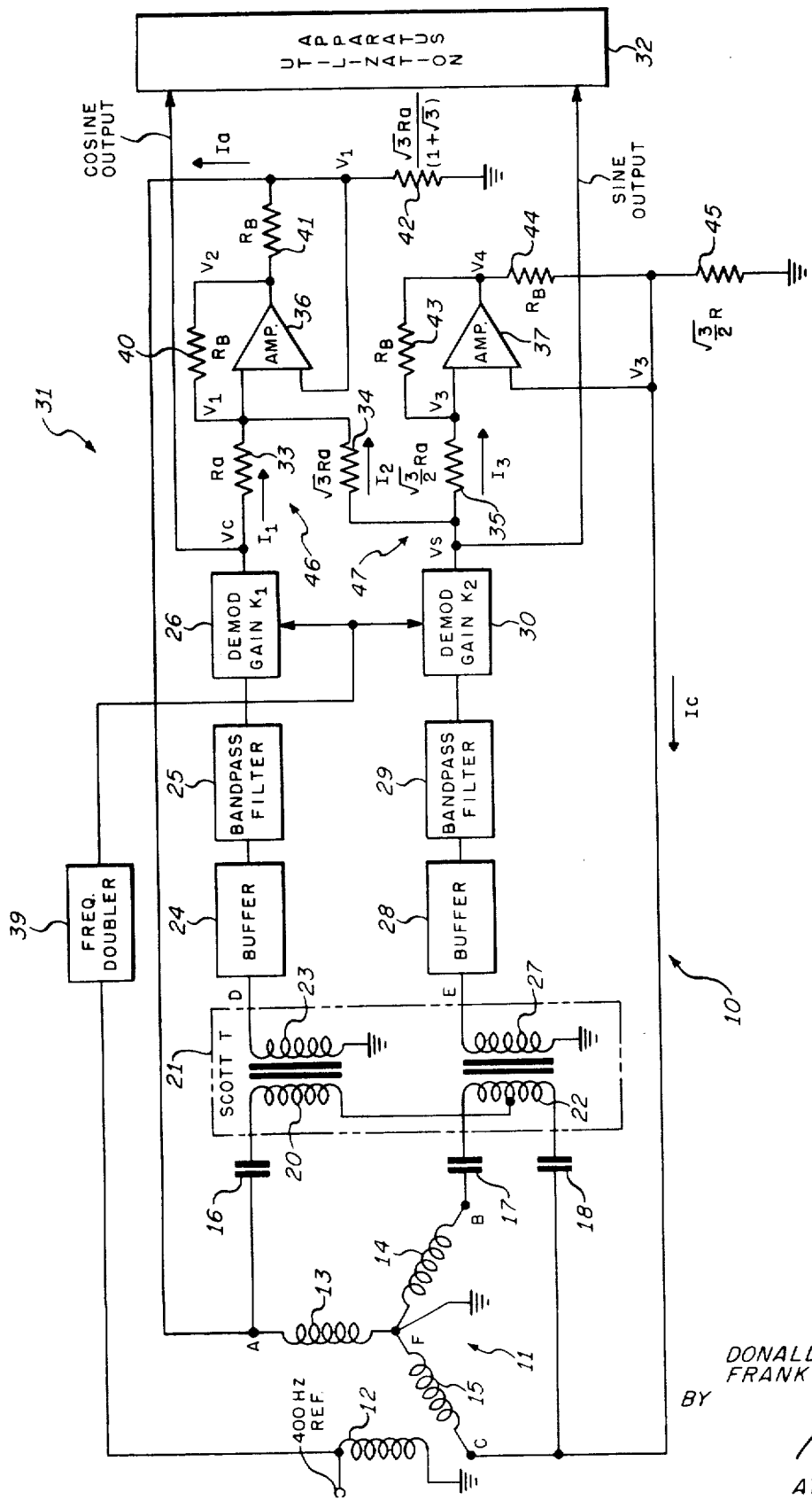
FIG. 1 is an electrical schematic diagram, partially in block form, of a compass system incorporating the present invention.

Referring now to FIG. 1, a compass system 10 is shown to include a magnetic azimuth detector or flux valve 11 excited by a 400 Hz reference source by means of an excitation winding 12. The flux valve 11 has three Y-connected legs 13, 14 and 15, respectively, which meet at a common terminal F. The other terminals of the windings 13, 14 and 15 are labeled A, B and C, respectively. The center terminal F is connected to a suitable ground potential. The terminal A is connected via a blocking capacitor 16 to one input winding 20 of a Scott T transformer 21. The terminals B and C are connected via respective blocking capacitors 17 and 18 to respective extremities of a second input winding 22 of the Scott T transformer which has its center-tapped connection connected to the other extremity of the input winding 20. The cosine output winding 23 of the Scott T transformer 21 is connected through a buffer circuit 24 and a bandpass filter 25 to a demodulator 26. In a similar manner, the sine output winding 27 of the Scott T transformer 21 is connected via a buffer circuit 28 and a bandpass filter 29 to a demodulator 30. The demodulator circuits 26 and 30 are responsive to the 400 Hz reference source via a frequency doubler 39. The demodulator 26 provides a DC signal at its output terminal Vc representative of the cosine component of the magnetic heading resultant vector to a compass utilization apparatus 32. The utilization apparatus 32 may include a directional gyro, its slaving amplifier as well as one or more heading indicators and heading repeaters as is generally known in the compass art and therefore not shown in detail. In a similar manner, a DC sine component signal is provided at the Vs output terminal of the demodulator 30 which is connected to the utilization apparatus 32.

To provide a closed loop current servo 31 with compensation between the feedback loops for differential levels in the DC output signals, the outputs of the demodulators 26 and 30 are connected via resistors 33 and 35 to respective operational amplifiers 36 and 37 with a resistor 34 being connected between the demodulator 30 and the amplifier 36. The output of the operational amplifier 36 is connected to its input via a resistor 40 and is also connected via a resistor 41 in feedback fashion to the terminal A of the winding 13. The output of the amplifier 36 is further connected via the resistor 41 to another of its input connections and to ground potential via a resistor 42. In a similar manner, the output of the operational amplifier 37 is connected to its input via a resistor 43 and is also connected via a resistor 44 in feedback fashion to the terminal C of winding 15. The output of the amplifier 37 is further connected via the resistor 44 to another of its input connections and to ground potential via a resistor 45. The current servo 31 acts as an infinite impedance source to the flux valve 11.

Figure 2:
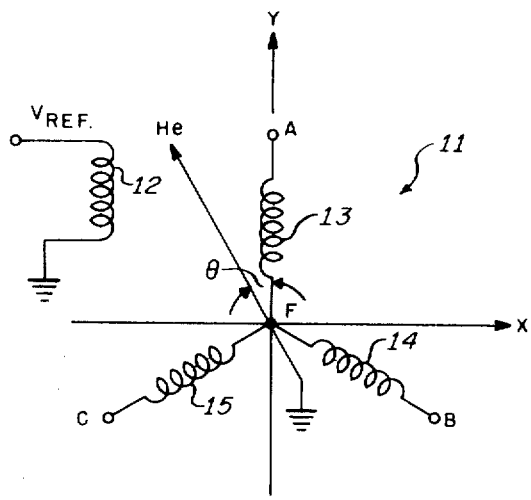
FIG. 2 is an electrical schematic wiring diagram of a three leg flux valve showing the sensed earth's magnetic field vector.

To understand the operation of the automatic field cancellation servo loop of the compass system 10 of the present invention requires an explanation of the operation of the flux valve 11 as shown more clearly in FIG. 2. Referring to FIG. 2, the connections and voltages as normally defined in a standard flux valve are as follows:

$V_{REF} = V_R \, \text{SIN} \, 2\pi 400 \, t$
$V_{AF} = [KmHe \, \text{COS} \, \theta] \, [\text{SIN} \, 2\pi \, 800 \, t]$
$V_{BF} = [KmHe \, \text{COS} \, (\theta - 120)] \, [\text{SIN} \, 2\pi \, 800 \, t]$
$V_{CF} = [KmHe \, \text{COS} \, (\theta + 120)] \, [\text{SIN} \, 2\pi \, 800 \, t]$ where $V_{REF}$ — Reference voltage, flux valve excitation voltage,
$V_{AF}$ — Flux valve output voltage in the leg 13,
$V_{BF}$ — Flux valve output voltage in the leg 14,
$V_{CF}$ — Flux valve output voltage in the leg 15,
$He$ — Earth's magnetic field,
$\theta$ — Angle of the earth's magnetic field $He$, and
$Km$ — A gain constant relating AC flux valve output voltage to DC magnetic field in oersteds.

For simplicity, the voltage relationships given above do not include the harmonics also generated by the flux valve 11 since, as described above, these become negligible with the closed loop operation. It will be noted from FIG. 2 that the voltages $V_{AF}$, $V_{BF}$ and $V_{CF}$ follow a three-wire format and are proportional to the magnitude and direction of the total earth's DC magnetic field as sensed by the flux valve 11.

Figure 3:
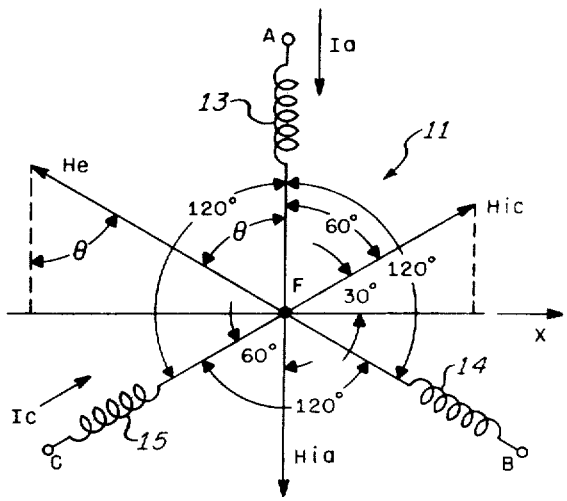
FIG. 3 is an electrical schematic wiring diagram of a three leg flux valve showing the sensed earth's magnetic field vector and cancellation techniques of the present invention.

By causing a DC current $Ia$ to flow thru a leg such as 13 of the flux valve 11, as shown in FIG. 3, a corresponding DC magnetic field is produced in the same direction as the current flow. The magnitude of the field is related to the magnitude of the current by $K_I$ which typically equals 0.167 oersteds per milliamp. When current is summed into two legs such as 13 and 15 of the flux valve 11, an induced field $Hi$ combines vectorially with the earth's field $He$ causing a resultant field $Hr$. The flux valve output voltages, $V_{AF}$, $V_{BF}$ and $V_{CF}$ will therefore depend on the resultant field $Hr$.

As shown in FIG. 1, the Scott T transformer 21 is used to convert the three-wire format to the more desirable sine-cosine format. The output of the transformer 21 at points D and E of FIG. 1 are then $$[KmHr \, \text{COS} \, \theta_R] \, [\text{SIN} \, 2\pi \, 800 \, t]$$

and $$[KmHr \, \text{SIN} \, \theta_R] \, [\text{SIN} \, 2\pi \, 800 \, t]$$

respectively.

where $Hr$ — Resultant magnetic field in the flux valve
$\theta_R$ — Angle of resultant field $Hr$ The resultant field $Hr$ is determined from the earth field and the feedback currents, $Ia$ and $Ic$. As indicated in FIG. 3, the feedback current $Ia$ induces a DC field $Hia$ and the feedback current $Ic$ induces a DC field $Hic$. The X and Y components of the resultant field $Hr$ are determined by resolving $He$, $Hia$, and $Hic$ into X and Y components and adding them.

The magnetic field relationships with respect to FIG. 3 are then as follows:

$Hex = -He \, \text{SIN} \, \theta$
$Hey = He \, \text{COS} \, \theta$
$Hicx = Hic \, \text{COS} \, 30°$
$Hicy = Hic \, \text{SIN} \, 30°$
$Hiax = 0$
$Hiay = -Hia$
$Hrx = \sqrt{3/2} \, Hic - He \, \text{SIN} \, \theta$
$Hry = He \, \text{COS} \, \theta + (1/2) \, Hic - Hia$
$Hrx = \sqrt{3/2} \, K_I Ic - He \, \text{SIN} \, \theta$
$Hry = He \, \text{COS} \, \theta + K_I (1/2) \, Ic - Ia)$ where $Hex$ — X axis component of $He$
$Hey$ — Y axis component of $He$
$Hi$ — Total DC field induced in the flux valve by the feedback currents
$Hia$ — DC field induced in the flux valve by feedback current $Ia$
$Hiax$ — X axis component of $Hia$
$Hiay$ — Y axis component of $Hia$
$Hic$ — DC field induced in the flux valve by feedback current $Ic$
$Hicx$ — X axis component of $Hic$
$Hicy$ — Y axis component of $Hic$
$Hrx$ — X axis component of $Hr$
$Hry$ — Y axis component of $Hr$
$Ia$ — Feedback current into flux valve leg 13
$Ic$ — Feedback current into flux valve leg 15
$K_I$ — Constant relating DC magnetic field in oersteds to DC current in the flux valve.

It will be noted that $Hr \, \text{COS} \, \theta_R$ equals $Hry$ and $Hr \, \text{SIN} \, \theta_R$ equals $Hrx$. The voltages at D and E of FIG. 1 are now $KmHry \, \text{SIN} \, 2\pi \, 800 \, t$ and $KmHrx \, \text{SIN} \, 2\pi \, 800 \, t$, respectively.

Referring again to FIG. 1, the signals at points D and E pass thru respective buffers 24 and 28 and bandpass filters 25 and 29. The purpose of this circuitry is to increase the signal-to-noise ratios for more accurate demodulation. The synchronous demodulators 26 and 30 including filters remove the 800 Hz carrier frequency from the information signals and provide signal gain. Thus, the open loop cosine output signal $Vc$ has the form $K_1 \, Km \, Hry$ and the open loop sine output signal $Vs$ has the form $K_2 \, Km \, Hrx$ where $K_1$ and $K_2$ are the respective open loop gains of these channels. These voltages, $Vc$ (cosine output) and $Vs$ (sine output) are fed to respective current sources 46 and 47 of the current servo 31. The operational amplifiers 36 and 37 when operating normally, drive their outputs to cause their respective differential input voltages to be zero. FIG. 1 shows that this has been assumed. The currents $I_1$, $I_2$ and $I_3$ are easily determined to be as follows with the resistors of the current servo 31 having the values indicated:

$$I_1 = \frac{Vc - V_1}{Ra} \qquad (1)$$

$$I_2 = \frac{Vs - V_1}{\sqrt{3} \, Ra} \qquad (2)$$

$$I_3 = \frac{2(Vs - V_4)}{\sqrt{3} \, Ra} \qquad (3)$$

$$V_1 = \frac{V_2 R_1}{R_B + R_1} \qquad (4)$$

$$V_4 = \frac{V_1 R_3}{R_B + R_3} \qquad (5)$$

where $$R_1 = \frac{\sqrt{3} \, Ra R_{FVA}}{\sqrt{3} \, Ra + (1 + \sqrt{3}) \, R_{FVA}} \qquad (6)$$

$$R_3 = \frac{\sqrt{3} \, Ra R_{FVC}}{\sqrt{3} \, Ra + 2 R_{FVC}} \qquad (7)$$

where $Vc$ — cosine component of magnetic heading output voltage
$Vs$ — sine component of magnetic heading output voltage
$R_{FVA}$ — resistance of flux valve leg 13
$R_{FVC}$ — resistance of flux valve leg 15

Inserting the expressions for $I_1$, $I_2$ and $I_3$ from equations (1), (2) and (3) into the $V_2$ and $V_4$ equations gives:

$$V_2 = V_1 - \frac{R_B}{Ra} \left[ Vc + \frac{Vs}{\sqrt{3}} - V_1 - \frac{V_1}{\sqrt{3}} \right] \qquad (8)$$

Which reduces to $$V_2 = V_1 \left[ \frac{\sqrt{3} \, Ra + (1 + \sqrt{3}) \, R_B}{\sqrt{3} \, Ra} \right] - \frac{R_B}{\sqrt{3} \, Ra} (\sqrt{3} \, Vc + Vs) \qquad (9)$$

and $$V_1 = V_3 - \frac{2R_B}{\sqrt{3} Ra} (Vs - V_3) \quad (10)$$

Which further reduces to $$V_1 = V_3 \left[ \frac{\sqrt{3} Ra + 2R_B}{\sqrt{3} Ra} \right] - \frac{2R_B}{\sqrt{3} Ra} Vs \quad (11)$$

Now inserting equation (9) into equation (4) and equation (11) into equation (5) yields the following expressions for $V_1$ and $V_3$:

$$V_1 = \frac{R_1 V_1}{R_1 + R_B} \left[ \frac{\sqrt{3} Ra + (1 + \sqrt{3}) R_B}{\sqrt{3} Ra} \right]$$

$$- \frac{R_1 R_B (\sqrt{3} Vc + Vs)}{\sqrt{3} Ra (R_1 + R_B)} \quad (12)$$

$$V_1 = - \frac{R_1(\sqrt{3} Vc + Vs)}{\sqrt{3} Ra - R_1(1 + \sqrt{3})} \quad (13)$$

$$V_3 = \frac{R_3 V_3 (\sqrt{3} Ra + 2R_B)}{\sqrt{3} Ra(R_3 + R_B)} - \frac{2R_3 R_B Vs}{(R_B + R_3)\sqrt{3} Ra} \quad (14)$$

or $$V_3 = - \frac{2R_3 Vs}{\sqrt{3} Ra - 2R_3} \quad (15)$$

Then utilizing equations (6) and (7) for $R_1$ and $R_3$ to evaluate $V_1$ and $V_2$ $$V_1 = \frac{R_{FVA}(\sqrt{3} Vc + Vs)}{\sqrt{3} Ra} \quad (16)$$

$$V_3 = - \frac{2\sqrt{3} R_{FVC} Vs}{3 Ra} \quad (17)$$

The currents to the flux valve are then given by $$Ia = \frac{V_1}{R_{FVA}} = - \frac{Vc}{Ra} - \frac{Vs}{\sqrt{3} Ra} \quad (18)$$

$$Ic = \frac{V_3}{R_{FVC}} = - \frac{2Vs}{\sqrt{3} Ra} \quad (19)$$

It should be noted that the feedback currents, $Ia$ and $Ic$ depend only on resistors $Ra$, $\sqrt{3} Ra$, and ½ $\sqrt{3} Ra$ and voltages $Vc$ and $Vs$. This is the characteristic of a voltage controlled current source.

Substituting the feedback currents, $Ia$ and $Ic$ into $Hry$ and $Hrx$ (FIG. 3) gives:

$$Hry = He \text{ COS } \theta + K_I \left( - \frac{Vs}{\sqrt{3} Ra} + \frac{Vs}{\sqrt{3} Ra} + \frac{Vc}{Ra} \right) \quad (20)$$

$Hry = He \text{ COS } \theta + (K_I Vc/Ra)$ (21)
$Hrx = -(K_I Vs/Ra) - He \text{ SIN } \theta$ (22)
$Hrx = -(K_I Vs/Ra) - He \text{ SIN } \theta$ (23)

Furthermore, as shown above, $Vc$ is given by $K_1$ $Km$ $Hry$ and $Vs$ by $K_2$ $Km$ $Hrx$ for the open loop case. These reduce as follows:

$Vc = K_1 Km He \text{ COS } \theta + (K_1 Km K_1 Vc/Ra)$ (24)

for stability $K_1$ must be negative. Thus, if $-K_3 = +K_1$ $Vc = -K_3 Km He \text{ COS } \theta - (K_3 Km K_I Vc/Ra)$ (25)

Now solving for the closed loop expression for $Vc$, $Vc = -(Ra K_3 Km He \text{ COS } \theta/Ra + K_3 Km K_I)$ (26)

By making $K_3$ very large, the term $Ra$ in the denominator is negligible. In the limit for infinite gain:

$Vc = -(RaHe/K_I) \text{ COS } \theta$ (27)

Similarly, the closed loop expression for $Vs$ is evaluated as follows:

$$Vs = \frac{K_2 Km K_I Vs}{Ra} - K_2 Km He \text{ SIN } \theta \quad (28)$$

$$Vs = - \frac{Ra K_2 Km He \text{ SIN } \theta}{Ra + K_2 Km K_I} \quad (29)$$

If $K_2$ becomes large, the $Vs$ expression can be reduced to $Vs = -(Ra He/K_I) \text{ SIN } \theta$ (30)

It has thus been demonstrated that a current servo can be configured to use summing current sources to reconvert sine-cosine format to three-wire format for feedback into a flux valve. In addition, a technique has been disclosed for closing a loop around a flux valve in general including polarities and resistor scaling for two or three leg flux valves. The greatest advantage stemming from the use of constant current sources to feedback to the valve is the fact that they cannot shunt current driven into the valve from other sources. This is obvious from equations (18) and (19) which clearly indicate that $Ia$ and $Ic$ depend only on $Ra$ and $Vc$ and $Vs$. A second advantage provided by the current sources is that the currents $Ia$ and $Ic$ can be scaled by $Ra$ without changing flux valve loading. Thus $Vc$ and $Vs$ can be voltages easily handled by present monolithic integrated circuits without reducing the shunt load to the flux valve.

Figure 4:
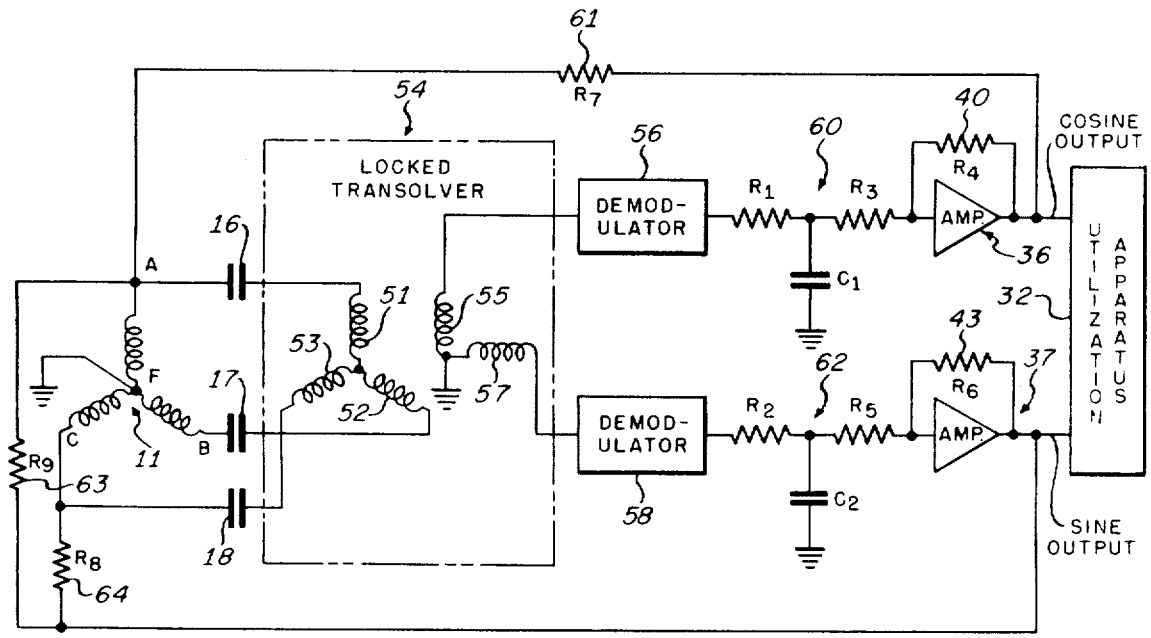
FIG. 4 is an electrical schematic diagram, partially in block form, of a compass system incorporating an alternative embodiment of the present invention.

An alternative embodiment of the present invention is shown in FIG. 4 where like reference characters indicate like elements. The flux valve 11 of the compass system 10 has its A, B and C terminals connected via respective capacitors 16, 17 and 18 to corresponding terminals of the Y connected input windings 51, 52 and 53 of a locked transolver 54. The cosine output winding 55 of the transolver 54 is connected to a demodulator 56 while the sine output winding 57 is connected to a demodulator 58. The demodulator 56 is connected through a filter circuit 60 to the operational amplifier 36 which has its DC cosine output connected to the utilization apparatus 32. The output of the operational amplifier 36 is also connected via a resistor 61 in feedback fashion to the terminal A of the flux valve 11. Similarly, the demodulator 58 is connected through a filter circuit 62 to the operational amplifier 37 which has its DC sine output connected to the utilization apparatus 32. The output of the operational amplifier 37 is also connected in feedback fashion via a resistor 63 to the terminal A and via a resistor 64 to the terminal C.

In operation, the ac signal from the flux valve 11 is resolved into sine and cosine components by the locked transolver 54. The capacitors 16, 17 and 18 prevent the flow of DC to the transolver 54. The cosine component of the flux valve signal is demodulated to DC in the demodulator 56, filtered in the filter circuit 60 and amplified in the amplifier 36. Similarly, the sine component is demodulated, filtered and amplified in circuits 58, 62 and 37, respectively. The resulting DC signal at the output of the amplifier 36 is fed back to the flux valve 11 through the resistor 61 while the DC signal at the output of the amplifier 37 is fed back through the resistors 63 and 64 to the flux valve 11 where fields are established in opposition to the earth's field. When the earth's field is precisely cancelled, both output windings 55 and 57 of the transolver 54 will be at null. This condition occurs when the outputs of the amplifiers 36 and 37 are proportional to cosine and sine of heading respectively. The precision of the field cancellation is determined by the gain of the amplifiers 36 and 37 which must be extremely high. The demodulators 56 and 58 also perform accurately due to the nulling technique which minimizes harmonics and provides an enhanced signal-to-noise ratio of the signals.

In FIG. 4, the time constants of the two channels of the servo loop can be adjusted by means of the $R_1C_1$ and $R_2C_2$ circuits of the filters 60 and 62, respectively to provide outputs which average out flux valve oscillation. This prevents desensitization of slaving due to periodic saturation of the slaving amplifier (not shown) used in conventional compass systems.

In the past, the filtering of flux valve oscillations has taken place in the slaving amplifier which may be undesirable.

It will be appreciated that the present invention is also applicable to two legged as well as three legged flux valves and to total earth's field sensors of the type disclosed in U.S. Pat. No. 3,276,273 entitled Earth's Magnetic Field Responsive Apparatus, invented by D. H. Baker, Issued Oct. 4, 1966 and assigned to the same assignee as the present invention.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. In a magnetic compass system for navigable craft, the combination comprising, detector means including a plurality of pick-up windings responsive to the direction of the earth's magnetic field relative thereto for providing a first plurality of alternating signals representative of respective vector components thereof, demodulating means responsive to said plurality of signals for providing DC voltage signals corresponding respectively thereto, said signals constituting system output voltage signals adapted to energize utilizing apparatus, means responsive to said demodulating means for converting said DC voltage signals to proportional d.c. current signals, said last-mentioned means constituting an infinite impedance current source independent of the impedance of said pick-up windings, and means supplying said DC current signals back to said pick-up windings for producing magnetic field components at said detector means corresponding to but opposing said earth's field components and independent of the impedance of said pick-up windings.

2. In a magnetic compass system of the character recited in claim 1, said converting means including first and second channels for feeding back first and second signals to said pick-up windings in the form of DC currents.

3. In a magnetic compass system of the character recited in claim , said converting means including compensation means for providing a specified ratio between said first and second signals which provides cancellation of differential levels in said DC output signals.

* * * * *